US007913256B2

(12) United States Patent
Torii et al.

(10) Patent No.: US 7,913,256 B2
(45) Date of Patent: *Mar. 22, 2011

(54) SCHEDULABILITY DETERMINATION METHOD AND REAL-TIME SYSTEM FOR EXECUTING A PLURALITY OF PERIODIC TALKS HAVING A PREDETERMINED PERIOD

(75) Inventors: Osamu Torii, Tokyo (JP); Seiji Maeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1580 days.

This patent is subject to a terminal disclaimer.

(21) Appl. No.: 11/233,176

(22) Filed: Sep. 23, 2005

(65) Prior Publication Data

US 2006/0218558 A1 Sep. 28, 2006

(30) Foreign Application Priority Data

Mar. 25, 2005 (JP) ................................. 2005-089647

(51) Int. Cl.
*G06F 9/46* (2006.01)
(52) U.S. Cl. .................... 718/102; 718/100; 718/103
(58) Field of Classification Search .................. 718/100, 718/102, 103
See application file for complete search history.

(56) References Cited

U.S. PATENT DOCUMENTS

| 7,356,817 B1* | 4/2008 | Cota-Robles et al. | 718/1 |
| 2002/0174164 A1* | 11/2002 | Hayashi | 709/102 |
| 2004/0268354 A1* | 12/2004 | Kanai et al. | 718/100 |
| 2005/0229177 A1 | 10/2005 | Torii et al. | |
| 2005/0283534 A1* | 12/2005 | Bigagli et al. | 709/229 |
| 2006/0218551 A1* | 9/2006 | Berstis et al. | 718/102 |

OTHER PUBLICATIONS

Sha et al. ("Real Time Scheduling Theory: A Historical Perspective", 2004, Kluwer Academic Publishers, pp. 101-155.*
Gerhard Fohler, et al., "Static Scheduling of Pipelined Periodic Tasks in Distributed Real-Time Systems", Real-Time Systems, XP010240868, Jun. 11, 1997, pp. 128-135.
Jaeyong Koh, et al., "Phased Scheduling of Continuous Media Tasks to Improve Quality of Service", Multimedia Computing and Systems, XP010291558, Jun. 28, 1998, pp. 108-117.
Eugene L. Lawler, et al., "Scheduling Periodically Occurring Tasks on Multiple Processors", Information Processing Letters, XP008085775, vol. 12, No. 1, Feb. 13, 1981, pp. 9-12.
C. L. Liu, et al., "Scheduling Algorithms for Multiprogramming in a Hard-Real-Time Environment", Journal of the Association for Computing Machinery, XP000651920, vol. 20, No. 1, Jan. 1973, pp. 46-61.
Jane W.S. Liu, "Optimality of the EDF and LST Algorithms", Real-Time Systems, Chapter 4, Section 6, 2000, pp. 67-68 and coverpage.

(Continued)

*Primary Examiner* — Kenneth Tang
(74) *Attorney, Agent, or Firm* — Oblon, Spivak, McClelland, Maier & Neustadt, L.L.P.

(57) ABSTRACT

A real-time system includes a plurality of processors for executing jobs of a plurality of periodic tasks each having predetermined period, assigns each job in a period of each of the tasks to the processors, calculates distribution of execution times during which jobs assigned are executed on the processors, determines, based on the distribution, whether each of the jobs finishes by a deadline within the period, determines that scheduling is impossible, when one of the jobs is determined not to finish by the deadline, determines whether the distribution of the execution times of the jobs each determined to finish by the deadline converge, and determines that scheduling is possible, when the distribution converge.

13 Claims, 12 Drawing Sheets

OTHER PUBLICATIONS

Theodore P. Baker, "An Analysis of EDF Schedulability on a Multi-processor", FSU Computer Science Technical Report, TR-030202, Feb. 7, 2003, pp. 1-16.

Jean-François Hermant, et al., "Real-time fixed and dynamic priority driven scheduling algorithms: theory and experience", Inria Technical Report, No. 3081, Dec. 1996, pp. 1-59 and coverpage.

* cited by examiner

| | Release time | Cycle time | Number of processors for use | Process time | Deadline time |
|---|---|---|---|---|---|
| Task 1 | 9.5 | 2 | 2 | 0.4 | 0.4 |
| Task 2 | 0 | 5 | 1 | 3.8 | 5 |

SCHEDULABILITY DETERMINATION METHOD AND REAL-TIME SYSTEM FOR EXECUTING A PLURALITY OF PERIODIC TALKS HAVING A PREDETERMINED PERIOD

CROSS-REFERENCE TO RELATED APPLICATIONS

This application is based upon and claims the benefit of priority from prior Japanese Patent Application No. 2005-089647, filed Mar. 25, 2005, the entire contents of which are incorporated herein by reference.

BACKGROUND OF THE INVENTION

1. Field of the Invention

The present invention relates to a real-time system which executes a plurality of periodic tasks in a plurality of processors by real-time scheduling.

2. Description of the Related Art

A real-time system is a computer system which is constrained by time, i.e., "the process of a task must be completed within a time limit set for the task". In general, a time limit set for each task is called "deadline", and incompletion of a task process by the deadline is called a "deadline miss". A deadline miss should not occur in real-time systems.

Typical examples of the real-time system are an air traffic control system, plant control monitoring system, and medical system. For example, the air traffic control system sets a safety interval between aircrafts and between an aircraft and an obstruction in order to avoid any crash. Given a task of determining whether airplanes will collide with each other within 1 sec, a 2-sec task process is useless. The air traffic control system must run under severe time constraints.

Operating a device under severe time constraints for inhibiting any deadline miss is called "real-time scheduling", which includes the following two methods:
1. a scheduling method
2. a real-time schedulability determination method The scheduling method will be explained first. A task typified by "a process of detecting a collision of an airplane" is executed by a finite number of processors mounted on the real-time system. Since one processor can process only one task at once, when there are a plurality of tasks to be processed by the real-time system, these tasks are shared in time division between a finite number of processors, and a timing, a processor, and a task to be executed are scheduled. This method will be called a scheduling method in this specification.

The real-time schedulability determination method will be explained next. In order to operate the real-time system under severe time constraints for inhibiting any deadline miss, tasks which exceed the performance of the system must not be accepted. For this reason, when a set of tasks and a scheduling method are given and the given tasks are scheduled by the scheduling method, the real-time system determines whether the time constraints of all the tasks can be observed (whether a deadline miss occurs or not), and decides tasks to be accepted by the system on the basis of the determination results. This determination method will be called a real-time schedulability determination method.

Whether the time constraint of a task can be observed depends on the task and at the same time on the scheduling method. When the total performance necessary to execute tasks is much lower than the performance of the real-time system, the system can execute tasks without any deadline miss in most cases regardless of the scheduling method. To the contrary, if the total performance necessary to execute tasks exceeds the performance of the real-time system, the system cannot prevent a deadline miss by any scheduling method. However, when the total performance necessary to execute tasks is equal to or slightly lower than the performance of the real-time system, the scheduling method decides whether the system can execute tasks without any deadline miss or a deadline miss occurs. To cope with these two cases, according to the real-time schedulability determination method, two inputs, i.e., a set of tasks and a scheduling method are input, and the result of determining whether real-time scheduling is possible or impossible is returned.

If a request to release a new task arrives at the real-time system, the system performs the following procedures. First, the system determines whether the time constraints of the new task and all tasks in execution in the real-time system can be observed by the scheduling method (no deadline miss occurs) when the new task is accepted. If so, the real-time system accepts release of the new task.

Second, the real-time system schedules the new task and all tasks in execution in the real-time system by using the scheduling method, and executes the tasks in accordance with the scheduling results.

In the scheduling method, it is important to assign proper processors to proper tasks in a proper period so as to execute each task without causing any deadline miss. Task execution free from any deadline miss is implemented by scheduling a processor used for each task so as to end the process of the task by the time limit.

A concrete example of a periodic task scheduling method is an EDF (Earliest Deadline First) algorithm (see, e.g., reference 1). The EDF algorithm is an algorithm of preferentially assigning a processor to a task of an early deadline at an early time.

A known example of the real-time schedulability determination method is a method of determining whether real-time scheduling is possible by the EDF algorithm (see, e.g., reference 2).

Another known example of the real-time schedulability determination method is a method of virtually scheduling tasks by actually using the scheduling method, and checking whether no deadline miss occurs in all the cycles of tasks (see, e.g., reference 3).

The determination method described in reference 2 assumes that the number of processors simultaneously assignable to one task is one, and does not consider a task which simultaneously requires a plurality of processors. Some tasks simultaneously require a plurality of processors in order to increase the process efficiency. Hence, a schedulability determination method available even when a plurality of processors need be simultaneously assigned to one task must be provided. Also, the determination method described in reference 2 may determine that real-time scheduling is impossible though real-time scheduling is actually possible, and the determination precision of this method is low.

The method of virtually scheduling tasks by actually using the scheduling method, and checking whether no deadline miss occurs in all the cycles of tasks takes a long calculation time for determination and is not practical.

Conventionally, when a plurality of periodic tasks are executed by a plurality of processors, it cannot be accurately determined at a high speed whether real-time scheduling is possible.

The present invention has been made to overcome the conventional drawbacks, and has as its object to provide a schedulability determination method capable of accurately determining at a high speed whether a plurality of periodic tasks can be scheduled in real time on a plurality of processors, and a real-time system using the method.

[Reference 1] J. W. S. Liu, "Real-Time Systems", Prentice Hall, 2000

[Reference 2] T. P. Baker, "An Analysis of EDF Schedulability on a Multiprocessor", FSU Computer Science Technical Report TR-030202, 2003

[Reference 3] J. F. Hermant et al., "Real-Time Fixed and Dynamic Priority Driven Scheduling Algorithms: Theory and Experience", Inria Technical Report, 1996

BRIEF SUMMARY OF THE INVENTION

According to a first aspect of the present invention, the real-time system includes a plurality of processors for executing jobs of a plurality of periodic tasks each having predetermined period; assigns each job in a period of each of the tasks to the processors; calculates distribution of execution times during which jobs assigned are executed in the processors; determines, based on the distribution, whether each of the jobs finishes by a deadline within the period; determines that scheduling is impossible, when one of the jobs is determined not to finish by the deadline; determines whether the distribution of the execution times of the jobs each determined to finish by the deadline converge; and determines that scheduling is possible, when the distribution converge.

According to a second aspect of the present invention the real-time system determines whether grid times exist after the latest release time among release times of the tasks, each of the grid times being a time point at which start times of periods of the tasks coincide with each other; determines that scheduling is possible, when the grid times exist and jobs assigned by a second grid time are determined to finish by their deadline; and determines that scheduling is impossible, when the grid times exist and one of jobs assigned by the second grid time is determined not to finish by its deadline.

BRIEF DESCRIPTION OF THE SEVERAL VIEWS OF THE DRAWING

FIG. 6 is a view for explaining carry-in;

DETAILED DESCRIPTION OF THE INVENTION

Preferred embodiments of the present invention will be described below with reference to the several views of the accompanying drawing.

The first and second embodiments below will describe a real-time system which schedules a plurality of periodic tasks in real time in a plurality of processors.

Figure 1:
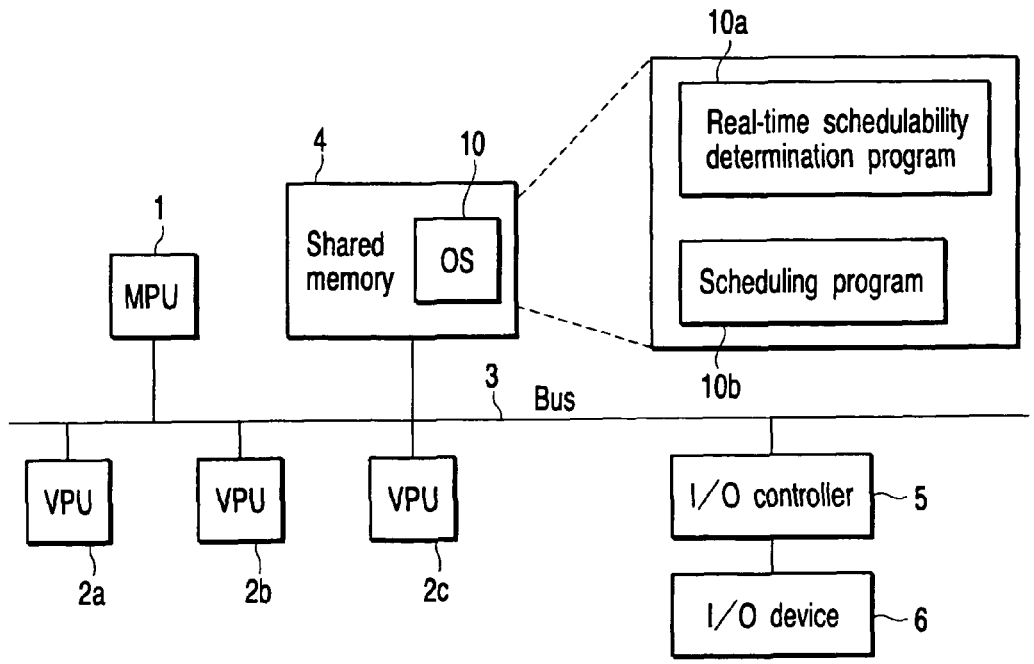
FIG. 1 is a block diagram showing an example of the configuration of a real-time system according to the first embodiment.

FIG. 1 is a block diagram showing an example of the configuration of a real-time system according to the first embodiment of the present invention. The real-time system is, e.g., a computer system used as a embedded system, and executes a plurality of tasks in real time under their time constraints.

The real-time system comprises an MPU (Master Processing Unit) 1, a plurality of (in this case, e.g., three) VPUs (Versatile Processing Units) 2a to 2c (if they need not be discriminated, to be referred to as VPUs 2), a bus 3, a shared memory 4, an I/O (Input/Output) controller 5, and an I/O device 6.

The MPU 1, VPUs 2, shared memory 4, and I/O controller 5 are connected to each other via the bus 3.

The MPU 1 is a main processor which controls the operation of the real-time system, and executes an operating system (OS) 10 stored in the shared memory 4. Each VPU 2 is a processor which executes various processes under the management of the MPU 1. A plurality of tasks which require real-time operation are executed in the VPUs 2. Each of tasks simultaneously requires one or a plurality of processors. The operating system 10 assigns to each task one or a plurality of VPUs in real time.

The operating system 10 includes a real-time schedulability determination program 10a and scheduling program 10b. The programs 10a and 10b are executed by the MPU 1 to cause the computer system to implement a real-time schedulability determination function (to be also simply referred to as a schedulability determination function hereinafter) and a scheduler function.

The real-time schedulability determination function executes a schedulability determination process of determining whether a plurality of periodic tasks which require real-time operation can be scheduled in real time in the VPUs 2 by using, e.g., the EDF algorithm. Each step of the schedulability determination process is described in the schedulability determination program 10a. The schedulability determination process generates a job execution time table in the shared memory 4 while performing scheduling by the scheduling program 10b. It is determined on the basis of the time table whether real-time scheduling is possible.

If it is determined that real-time scheduling is possible, the scheduler function actually schedules a plurality of periodic tasks in the VPUs 2 by using, e.g., the EDF algorithm. As described above, the EDF algorithm preferentially assigns a processor to a task of an early deadline at an early time. An algorithm for implementing the scheduler function (e.g., an algorithm of scheduling a plurality of tasks on the basis of their priorities, like the EDF algorithm) is described in the scheduling program 10b.

The schedulability determination process is executed when, for example, a request to execute a given application program is issued. For example, the real-time schedulability determination program 10a is executed by the MPU 1 when a request from the input/output device (I/O device 6) (connected to, e.g., the bus 3) of the computer system is detected, or, e.g., an "interrupt" to request execution of a new application program (new task) is detected by the operating system (OS) 10 in accordance with execution of an application program.

Figure 14:
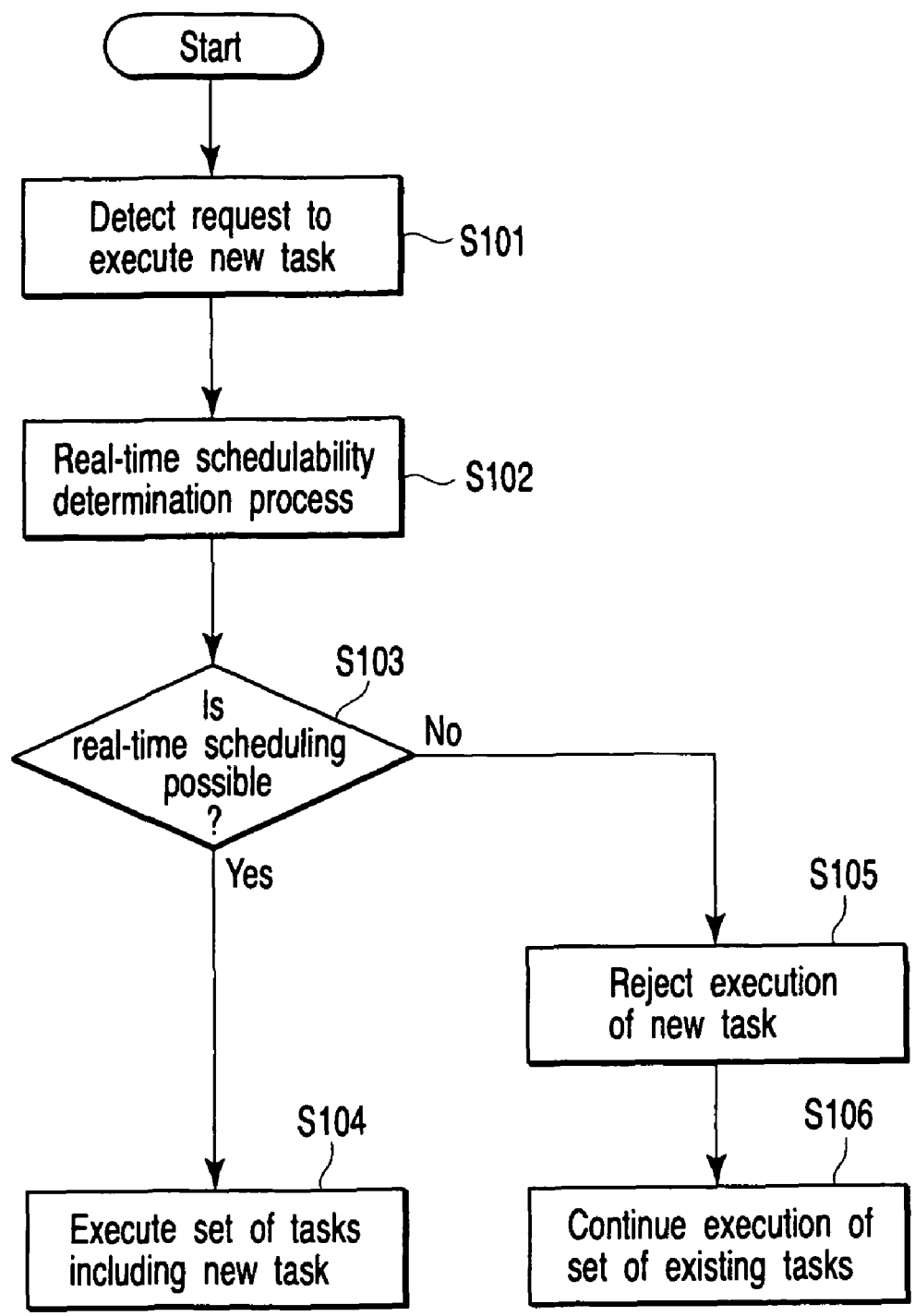
FIG. 14 is a flowchart for explaining an outline of process operation of the real-time system according to the first embodiment.

FIG. 14 is a flowchart for explaining process operation when, for example, a request to execute a given application program (new task) is detected in the computer system of FIG. 1.

If a request to execute a new application program (new task) is detected (step S101), parameter information of the new task including the release time of the task serving as the execution start time of the new task, a cycle time (or a period) for periodically executing the task, the number of processors (number of processors for use) used to execute the task, the process time of a job to be processed every cycle time, and the allowed time (deadline time) from the start of processing a job to the end of the process time every cycle time is loaded into a work area defined in advance in the shared memory 4 for execution of the OS 10. As a result, parameter information as shown in FIG. 4 is stored in the work area for each task of a task set containing a plurality of tasks (new tasks) in the new application program and a plurality of tasks in a running application program.

Figures 4, 5:
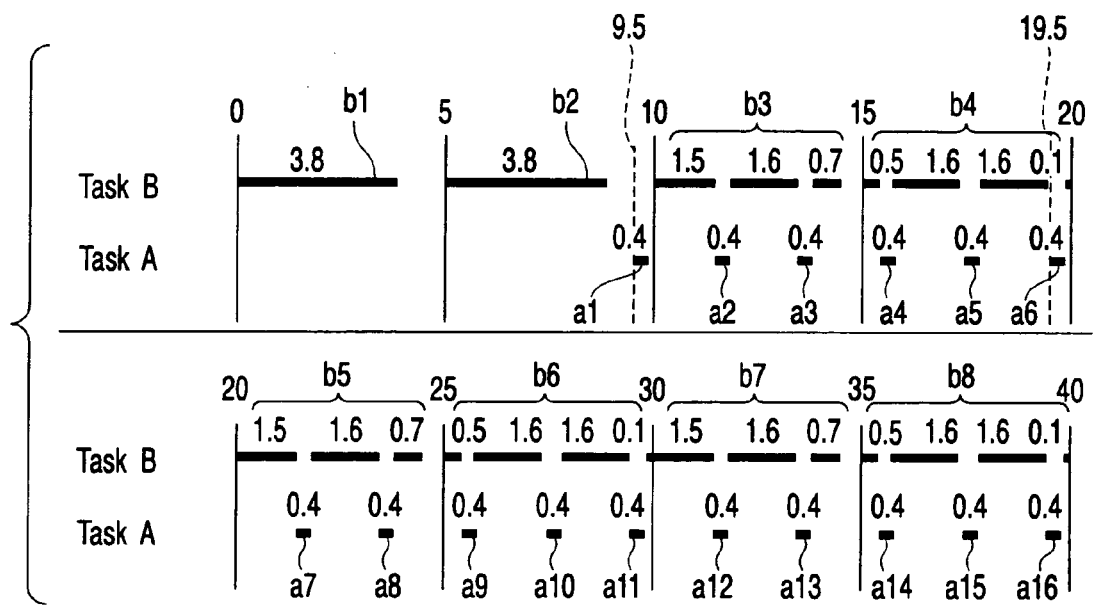
FIG. 4 is a table showing an example of parameter information of a periodic task.
FIG. 5 is a view showing a job execution pattern when two tasks (tasks A and B) are scheduled using the EDF algorithm.

While loading the parameter information as shown in FIG. 4, the MPU 1 executes the real-time schedulability determination program 10a (step S102).

If it is determined that scheduling is possible for each task of the task set (YES in step S103), the scheduling program 10b is executed, and the tasks are executed by the VPUs 2a to 2c while scheduling is done for the task set containing the new tasks and existing tasks (step S104).

If the task set containing the new tasks and existing tasks includes even one task which is determined to be likely to generate a deadline miss, execution of the new tasks is rejected (step S105), and the scheduler function does not schedule the tasks (new tasks) in the new application program. While the scheduling program 10b is executed to perform scheduling, the VPUs 2a to 2c keep executing the tasks in the running application program (step S106). This can prevent generation of any deadline miss in advance.

Figure 2:
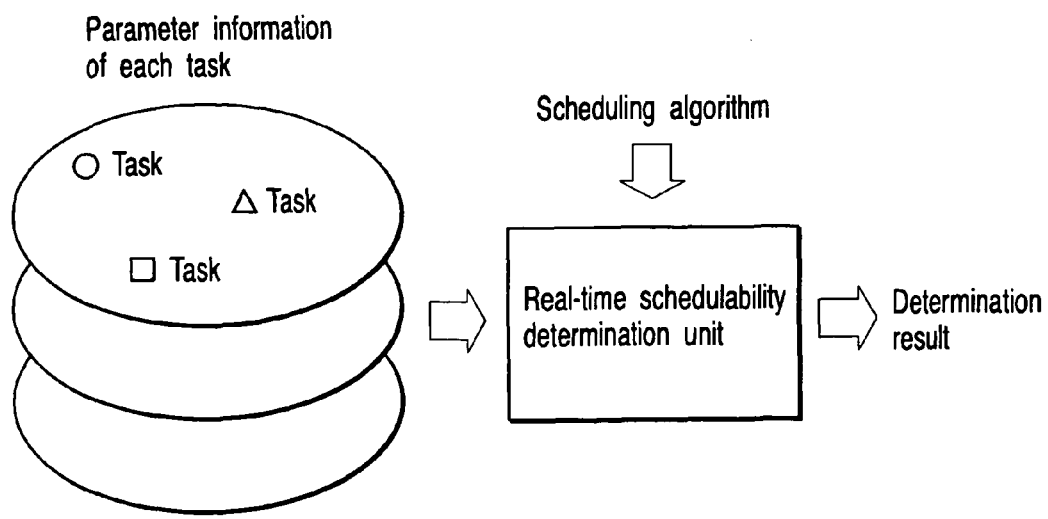
FIG. 2 is a view for explaining an outline of a schedulability determination process.

FIG. 2 is a view for explaining an outline of the schedulability determination process.

The real-time schedulability determination function receives a set of tasks to be scheduled and a scheduling algorithm. Task parameter information of each task is loaded from an application program corresponding to the task into a predetermined area in the shared memory 4, and transferred to the OS, i.e., the MPU 1 which executes the real-time schedulability determination program. The real-time schedulability determination function utilizes the input information to execute the real-time schedulability determination process. The real-time schedulability determination function returns a determination result (real-time scheduling is possible/real-time scheduling is impossible) to the OS. The scheduler function performs scheduling on the basis of the determination result.

A target task in the first and second embodiments will be explained in detail. The target task is a periodic task, and each task has parameter information including the release time, the cycle time, the number of processors for use, the process time of a job to be processed every cycle time, and the allowed time (deadline time) from the start of the cycle time to the end of the job. Each task is made up of a plurality of repetitive task execution units called "jobs" every cycle time.

For a task released into the real-time system at "release time", a new job of the task is released in each time equal to the "cycle time". When idle processors corresponding to the "number of processors for use" or more exist at job release, execution of the job starts; otherwise, the job enters the wait state. Alternatively, execution of the job starts by suspending a running job of a low priority. Each released job must be executed for a time equal to the "process time" by simultaneously using processors equal in number to the "number of processors for use" within a time equal to the "deadline time" after the job release time (start time of the cycle time). The time (time by which execution of a job must be completed) obtained by adding the deadline time to the job release time will be called "absolute deadline time". When a plurality of tasks exist, the release time, the cycle time, the number of processors for use, the process time, and the deadline time may change for each task.

Figure 3:
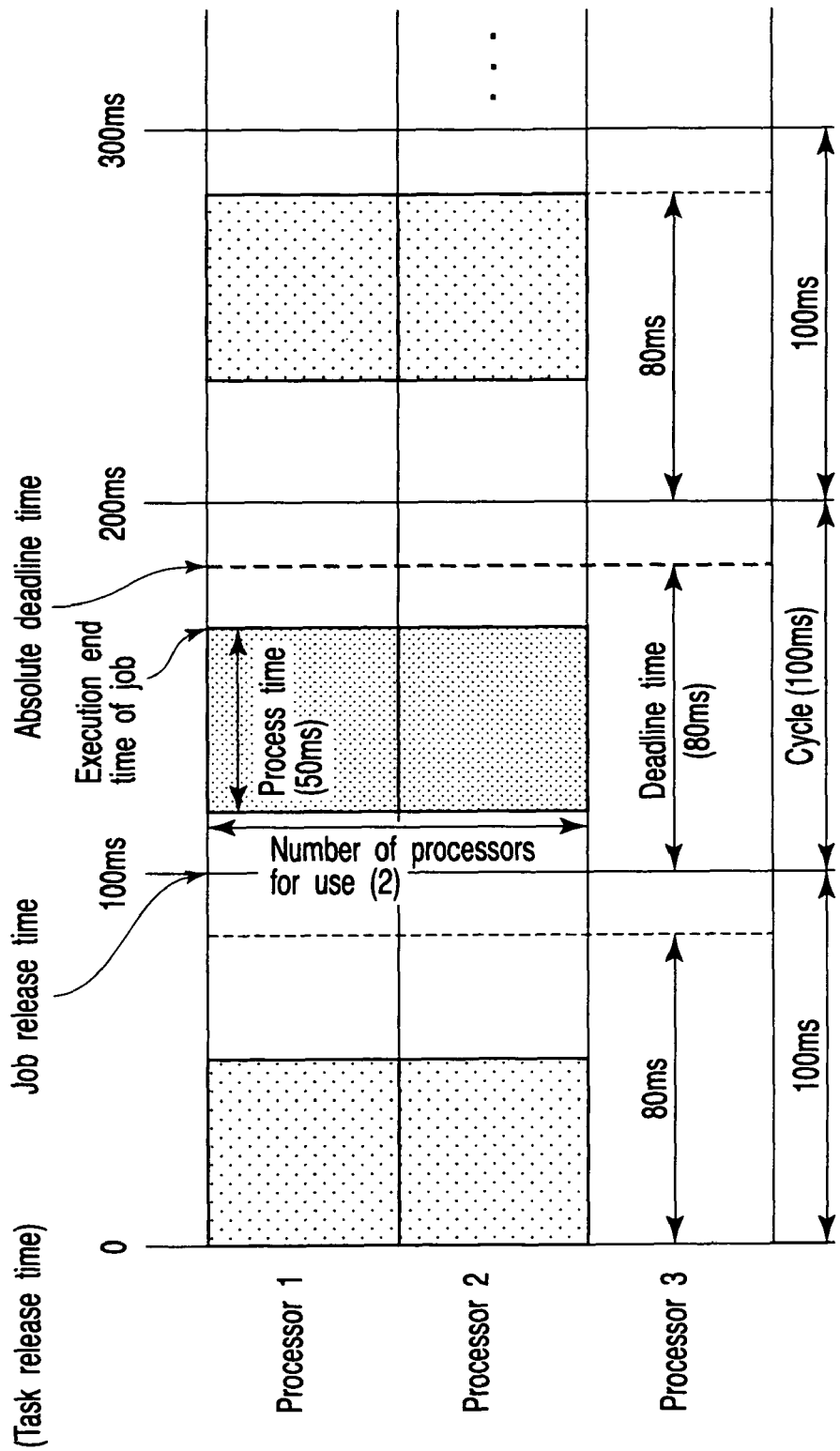
FIG. 3 is a timing chart showing a concrete example of a periodic task.

FIG. 3 shows an example of a periodic task, the abscissa represents the time axis, and the ordinate represents a processor. In FIG. 3, a task having release time "0", a cycle time "100 ms", the number of processors for use "2", a process time "50 ms", and a deadline time "80 ms" is executed in a real-time system in which the total number of processors available for scheduling is "3".

The execution state of the task is illustrated by three cycles from the task release time. In each cycle time, a job having a process time "50 ms" is executed by simultaneously using two processors. In FIG. 3, time (execution end time) at which execution of each job ends falls within a period from job release time to absolute deadline time (no deadline miss occurs).

A scheduling method executed by the scheduler function will be explained. In general, the scheduling method repeats a sequence of managing jobs in execution in processors and jobs waiting for execution, when a job in execution ends or a job waiting for execution is added, searching for an idle processor or suspending a job of a low priority among jobs in execution, and starting execution of a job of the highest priority among jobs waiting for execution. Further, a job, its timing, and a processor for use are scheduled.

Especially, the first and second embodiments employ a scheduling method which satisfies the following conditions. Let L be the least common multiple of the cycle times of all tasks in a periodic task set. When two jobs j1 and j2 of a task i1, and two jobs j3 and j4 of a task i2 satisfy following relationship:

the release time of the job j2—the release time of the job j1
=the release time of the job j4—the release time of the job j3
=an integer multiple of L, regardless of how to select the two jobs j1 and j2 of the task i1, and the two jobs j3 and j4 of the task i2, 1. The scheduling method executes the job j2 preferentially for the job j4 when the job j1 is executed preferentially to the job j3.

2. The scheduling method executes the job j4 preferentially for the job j2 when the job j3 is executed preferentially to the job j1.

These conditions will be called "conditions associated with the priority of a task". The first and second embodiments are directed only to a scheduling method which meets the "conditions associated with the priority of a task".

The EDF algorithm preferentially executes a job of an early deadline (absolute deadline time). An EDF algorithm with a constraint that when jobs having the same absolute deadline time exist, the job of a specific task is always preferentially executed is a scheduling method which meets the above conditions. As far as no confusion occurs, the EDF algorithm with the constraint will be simply referred to as an EDF algorithm. The EDF algorithm is the scheduling method which satisfy the "conditions associated with the priority of a task".

A method of determining whether a set of tasks can be scheduled in real time will be described by exemplifying the EDF algorithm as the scheduling method.

The method of virtually scheduling tasks by actually using the EDF algorithm, and checking whether no deadline miss occurs in "all" cycle times associated with execution of tasks (checking whether no deadline miss occurs for all jobs) takes a long calculation time for determination and is therefore not practical.

In the first embodiment, therefore, tasks are virtually scheduled by actually using the EDF algorithm, and whether a deadline miss occurs is checked not in all the cycle times of tasks but in "some" early cycle times. By using the result, it is determined whether real-time scheduling is possible.

In this case, while the real-time schedulability determination program 10a is executed by the MPU 1 to virtually schedule a set of given tasks, the distribution of the execution times of jobs including the execution start time and execution end time in each cycle time when the jobs are executed by the VPUs 2a to 2c is calculated, and a time table as shown in FIG. 5 is generated in the shared memory 4. This process will be called a simulation.

The schedulability determination process performs this simulation to determine whether real-time scheduling is possible or not.

The generated time table exhibits the distribution of the execution times of jobs in each cycle time when virtually scheduled jobs are executed by the VPUs 2a to 2c (processors). The distribution (FIG. 5) of execution times when jobs are executed by a plurality of processors will be called a job execution pattern (to be described later).

More specifically, real-time schedulability is determined by the following method. In the simulation for a set of tasks, the EDF algorithm repeats a sequence of managing jobs in execution in processors and jobs in wait for execution, when a job in execution ends or a new job is released to increase the number of jobs in wait for execution, searching for an idle processor or suspending a job of a low priority among jobs in execution, and starting execution of a job of the highest priority in wait for execution. At this time, the real-time schedulability determination method also manages jobs in execution in processors and jobs in wait for execution, and checks two conditions:

1. letting L be the least common multiple of the cycles of all tasks, whether the execution patterns of the tasks converge by using a time interval L as a criterion, and 2. whether a job in execution generates a deadline miss.

Strictly speaking, convergence of the job execution patterns of tasks at time T means that the following conditions are satisfied for all tasks i:

1. when the job of a task i is executed at time t (T≦t), the job of the task i is also executed at time t-L, and 2. when the job of the task i is not executed at time t, the job of the task i is also not executed at time t-L.

The job execution pattern is the distribution of the execution times of the jobs of each task in a plurality of processors, as shown in FIG. 5. Note that FIG. 5 illustrates a job execution pattern for one processor.

According to the real-time schedulability determination method, when jobs executed by a plurality of processors do not generate any deadline miss and job execution patterns converge, it is determined that real-time scheduling is possible without scheduling tasks after convergence. When a job generates a deadline miss, it is determined that real-time scheduling is impossible.

A case wherein task A having release time "9.5", a cycle time "2", the number of processors for use "2", a process time "0.4", and a deadline time "0.4", and task B having release time "0", a cycle time "5", the number of processors for use "1", a process time "3.8", and a deadline time "5" are scheduled using the EDF algorithm, as shown in FIG. 4, will be explained.

FIG. 5 shows a job execution pattern when the two tasks shown in FIG. 4, i.e., tasks A and B are scheduled using the EDF algorithm. Note that FIG. 5 shows the execution period of each task in one processor. The abscissa represents time, and each execution period of a task is indicated by a horizontal line for each task. The first stage shows the execution periods of tasks A and B from time "0" to time "20", and the second stage shows those from time "20" to time "40".

Task B is released at time "0", and a job b1 is executed for the process time "3.8" in the cycle time "5" of task B. In a cycle time from time "10", a job b3 in the cycle time is divided into three and executed. The job b3 starts to be executed at execution start time "10". The job b3 is executed for a time "1.5", executed again for a time "1.6" after a time "0.4", and executed again for a time "0.7" after a time "0.4". The execution end time of the job b3 is "4.6".

Task A is released at time "9.5", and a job a1 is executed for the process time "0.4" in the cycle time "2" of task A. After that, jobs a2 to a16 are executed each for the process time "0.4" every cycle time "2".

The value of the least common multiple L of the cycle times of tasks A and B is "10", and the job execution patterns of the tasks converge at time "20". Before time "20", the job execution patterns of the tasks do not converge.

For example, the job execution patterns of the tasks do not converge at time "19.5" upon the lapse of a time "10", which is the least common multiple of the cycle "2" of task A and the cycle "5" of task B, after release time "9.5" of task B.

In this manner, convergence of job execution patterns means that the job execution patterns are identical between two successive time intervals (e.g., the first time interval from time "10" to time "20" and the second time interval from time "20" to time "30") that are divided by a time (e.g., the least common multiple "10" of the cycle times of tasks A and B) corresponding to the least common multiple of the cycle times of all tasks after the latest release time (e.g., release time "9.5" of task A) among the release times of a plurality of tasks (in this case, tasks A and B). In FIG. 5, the job execution pattern is identical between the first and second time intervals, and the job execution patterns of tasks A and B converge at time "20" at the boundary between the first and second time intervals.

In the schedulability determination process, the simulation is performed using a scheduling algorithm of assigning the jobs of tasks to a plurality of processors on the basis of the priority of each task, like the EDF algorithm. Hence, the job execution pattern is a job execution pattern in each processor when the processor executes a job in each cycle time of each task by scheduling using the scheduling algorithm on the basis of the number of processors used to execute the task, the release time, the cycle time, the deadline time of each cycle time, a time (process time) taken to execute a job in each cycle time of the task, and the priority of the task, which parameters are set in advance for each task.

That a job does not generate any deadline miss means that the job ends within a time (within a deadline time) from the start time (job release time) to the absolute deadline time of a cycle time during which the job is executed. In other words, the execution end time of a job falls within a time up to the absolute deadline time.

Whether the job execution patterns of tasks converge can be determined by calculating a carry-in to be defined below.

The carry-in represents an unexecuted work-load (job) of a task at given time. Let J be a set of jobs which have already been released at time T out of jobs of a task $i$. Jobs which belong to J are classified into three types:

First type) a job whose execution has ended at time T
Second type) a job in execution at time T
Third type) a job whose execution has not started at time T Letting W be the sum of unexecuted work-loads for the second and third types, the carry-in of the task $i$ at time T is defined as W.

Figure 6:
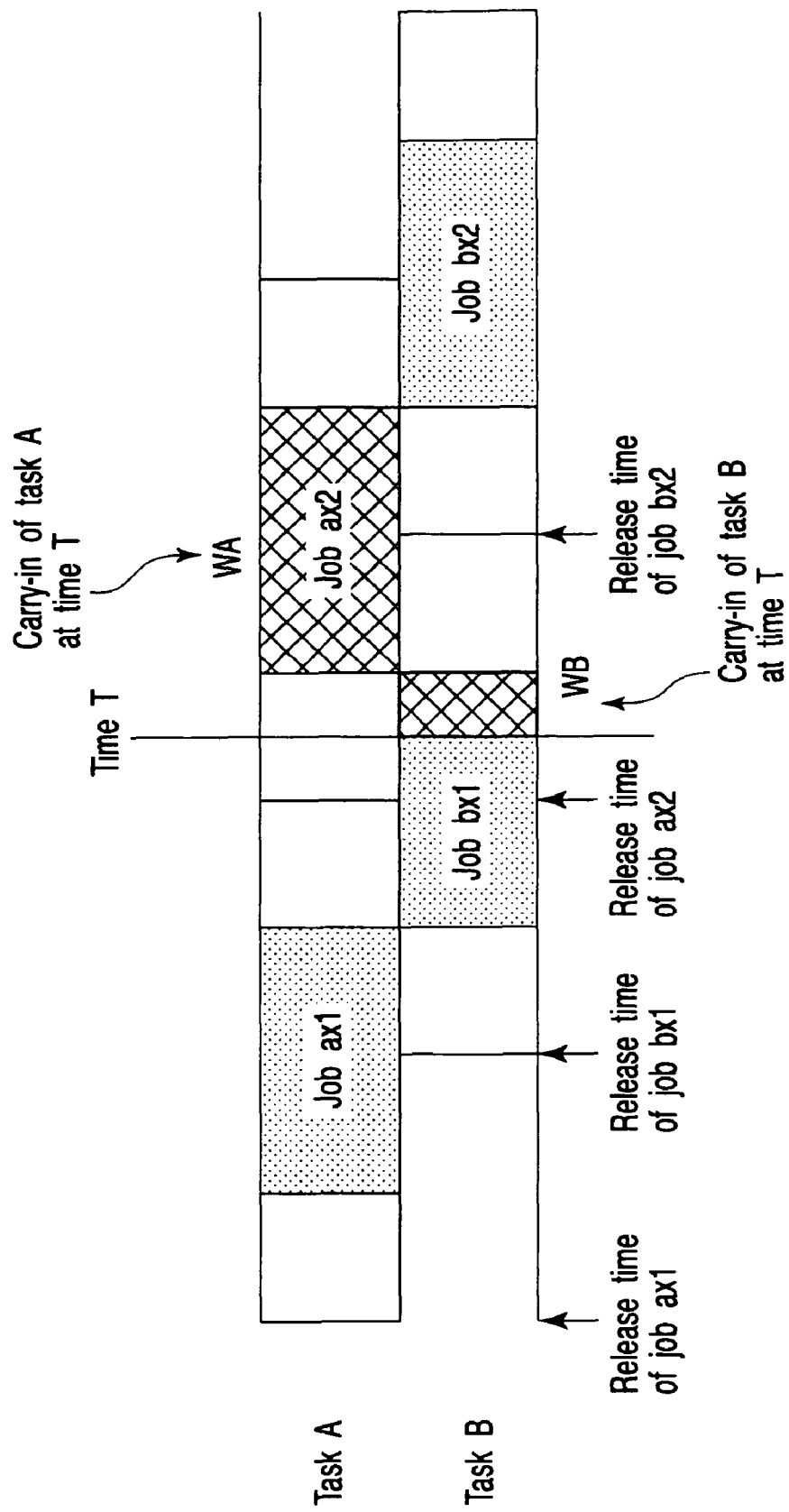

FIG. 6 is a view for explaining the carry-ins of tasks A and B. The set J of (released) jobs whose cycle times have already started at time T out of two jobs ax1 and ax2 of task A and two jobs bx1 and bx2 of task B is {job ax1, job ax2, job bx1}. The jobs in the job set J are classified as follows.

1. a job whose execution has ended at time T: job ax1
2. a job in execution at time T: job bx1
3. a job whose execution has not started at time T: job ax2

The unexecuted work-load of the job ax2 at time T is WA, and the unexecuted work-load of the job bx1 at time T is WB. From this, 1. the carry-in of task A at time T: WA
2. the carry-in of task B at time T: WB Let R be the latest release time among the release times of all tasks, and L be the least common multiple of the cycles of all the tasks. Then, when a carry-in value at time T (R+L≦T) is equal to a carry-in value at time T-L for all tasks $i$, it is defined that carry-ins converge at time T. When carry-ins converge at time T, job execution patterns converge at time T.

In FIG. 5, at time "9.5", the carry-in of task A is "0", and that of task B is "0". At time "19.5", the carry-in of task A is "0", and that of task B is "0.1". The carry-in values of task B are different, and the job execution patterns of the tasks have not converged yet at time "19.5".

To the contrary, at time "10", the carry-in of task A is "0", and that of task B is "0". At time "20, "the carry-in of task A is "0", and that of task B is "0". These carry-in values are equal to each other, and the job execution patterns of the tasks have converged at time "20".

In this way, job execution patterns can be determined to converge when unexecuted jobs in the cycle times of tasks whose cycle times have already started are identical at the first time (e.g., time "10" in FIG. 5) and the second time (e.g., time "20" in FIG. 5) which have a time difference (e.g., "10" in FIG. 5) corresponding to the least common multiple of the cycle times of all tasks after the latest release time (e.g., release time "9.5" of task A in FIG. 5) among the release times of the tasks.

A method of determining whether a set of tasks can be scheduled in real time when the scheduling method is the EDF algorithm, i.e., the real-time schedulability determination process in step S102 of FIG. 14 will be explained with reference to the flowchart of FIG. 7.

The schedulability determination process is executed when, e.g., a request to execute a given application program (request to execute a new task) is detected. In this case, the schedulability determination function determines whether a deadline miss occurs, for all tasks including a plurality of tasks (new tasks) in the application program and a plurality of tasks in a running application program.

When the request to execute the new application (new task) is detected, execution of the schedulability determination process starts. The simulation is performed to schedule all tasks including a plurality of tasks in the application program and a plurality of tasks in a running application program by using the scheduling program 10b and sequentially execute jobs from a job of the highest priority (step S201).

As described above, the scheduling algorithm schedules a job, its timing, and a processor used for execution by repeating a sequence of managing jobs in execution in processors and jobs in wait for execution, when a job in execution ends or a job in wait for execution is added (when a new job is released), searching for an idle processor or suspending a job of a low priority among jobs in execution, and starting by the processor execution of a job of the highest priority among jobs in wait for execution. In this case, every time a new job is released in accordance with scheduling, it is determined at the job release time whether carry-ins converge. Also, every time a job in execution ends, it is determined whether the job generates a deadline miss.

More specifically, if a new job is released in the simulation (step S202), the flow advances to step S205 to determine at the job release time whether carry-ins converge. If the carry-ins are determined not to converge, the flow returns to step S201 to start executing jobs from a job of a high priority in accordance with scheduling. That is, the distribution of execution times of the job in the cycle time when the job is executed by a plurality of processors is calculated. If a job in execution ends (step S202), the flow advances to step S203 to determine, on the basis of the distribution of execution times of the job, whether the job generates a deadline miss. If no deadline miss occurs, the flow returns to step S201.

In step S203, if the job whose execution ended generates a deadline miss, it is determined that real-time scheduling is impossible (step S204), and the schedulability determination process ends.

If carry-ins converge in step S205 at time (release time) at which a new job has been released, it is determined that real-time scheduling is possible (step S206), and the schedulability determination process ends.

If carry-ins converge in step S205, it is determined in step S203 that jobs executed by a time at which the carry-ins converge do not generate any deadline miss.

In step S203, it is determined that no deadline miss occurs if the execution end time of the job falls within the time till the absolute deadline time, i.e., the job ends within a predetermined deadline time (the time till the absolute deadline time) of the job (task) after the release time (start time of the cycle time) of the job. If NO in step S203, it is determined that a deadline miss occurs.

In step S205, the carry-in of each of tasks is calculated at the time (job release time) at which the new job has been released, and the time preceding from the job release time by a time corresponding to the least a common multiple of the cycle times of all tasks. If the carry-ins of the tasks are equal to each other at the two times, the carry-ins are determined to converge; if they are different from each other, the carry-ins are determined not to converge.

Figure 7:
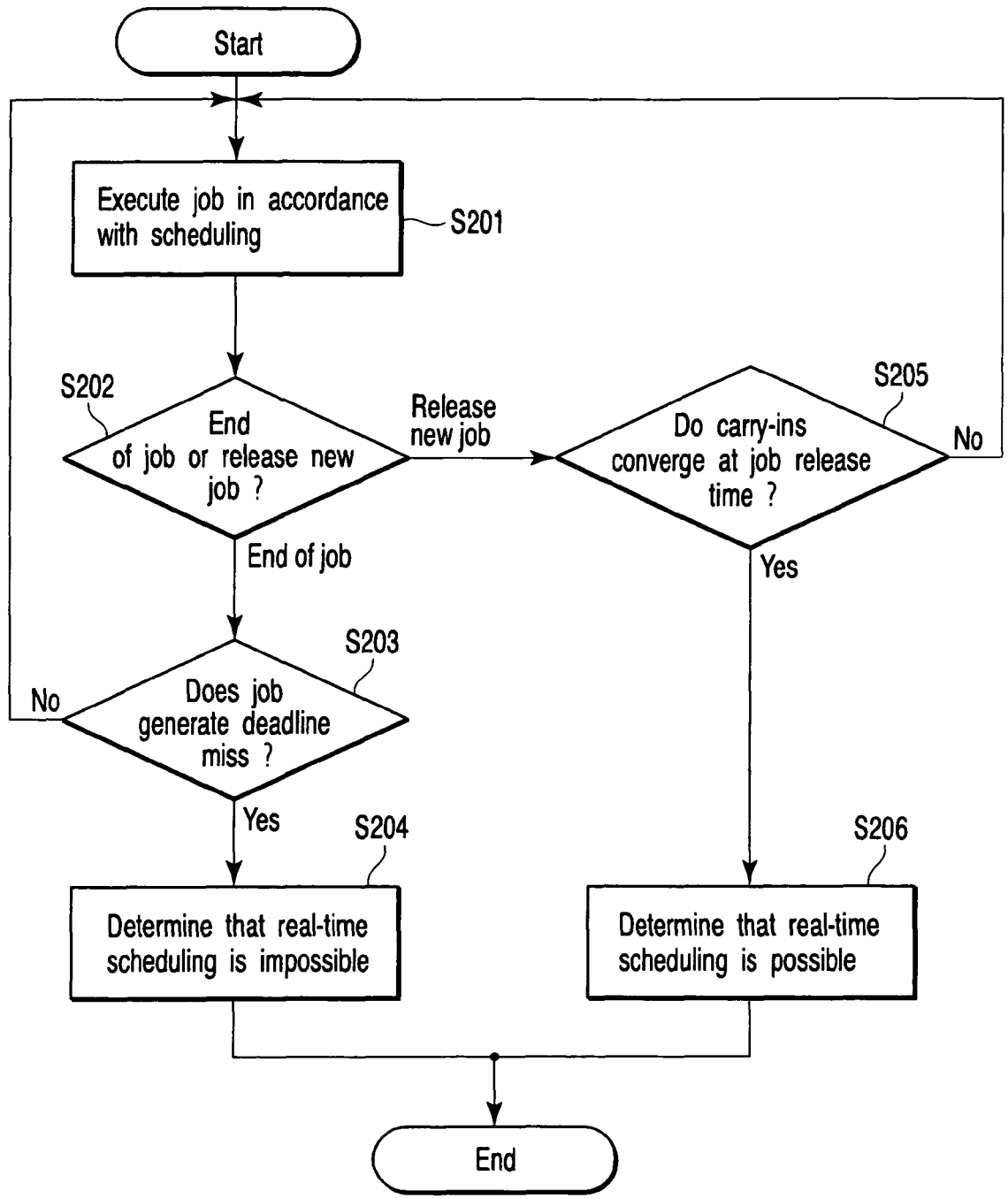
FIG. 7 is a flowchart for explaining a real-time schedulability determination process (first schedulability determination process) according to the first embodiment.
Figure 8:
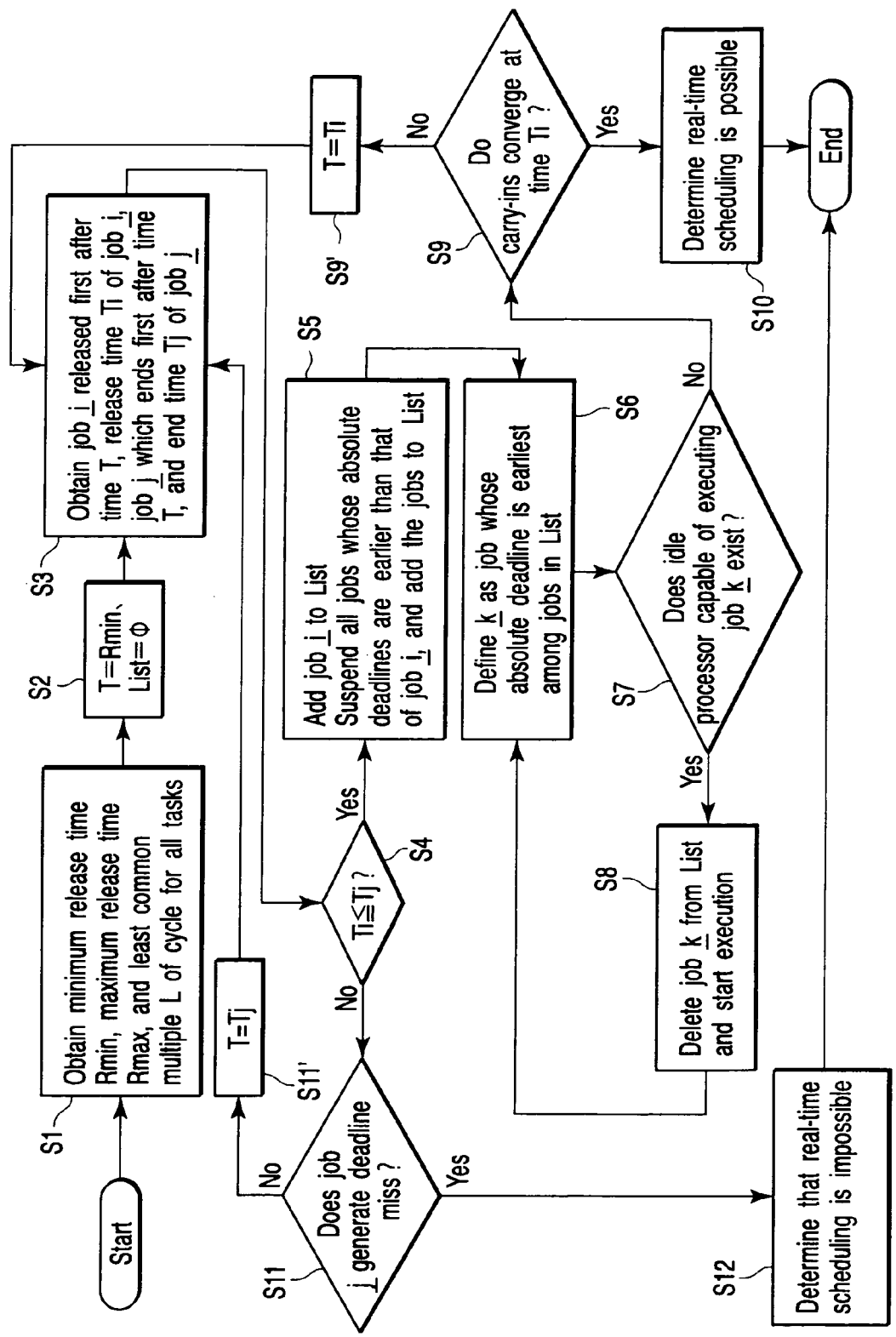
FIG. 8 is a flowchart showing in more detail the real-time schedulability determination process in FIG. 7.

FIG. 8 is a flowchart showing in more detail the schedulability determination process operation shown in FIG. 7.

When a request to execute a new task is detected, execution of the schedulability determination process starts. Among the release times of all tasks including a plurality of tasks in a given application program and a plurality of tasks in a running application program, the earliest release time (minimum release time) and the latest release time (maximum release time), and the least common multiple of the cycles of all tasks are obtained and defined as Rmin, Rmax, and L, respectively (step S1).

Time "T" is set to Rmin, and a blank execution wait job list "List" is created (step S2).

A job i released first after time T is obtained, and its release time is defined as Ti. A job j whose execution ends first after time T is obtained, and its execution end time is defined as Tj (step S3). Then, the flow advances to step S4.

In step S4 if Ti≦Tj (which means that time at which the job i is released comes immediately after time T), the flow advances to step S5; if Ti>Tj (which means that time at which the job j ends comes immediately after time T), to step S11.

In step S5, (a) the job i is added to the execution wait job list List. (b) If a job whose absolute deadline time is earlier than that of the job i exists in jobs in execution, execution of these jobs is suspended at time Ti, the jobs are added to the execution wait job list List, and the flow advances to step S6.

In step S6, a job whose absolute deadline time is the earliest in the execution wait job list List is defined as k, and the flow advances to step S7.

In step S7, if an idle processor which can execute the job k at time Ti exists, the flow advances to step S8 to delete the job k from the execution wait job list List and start execution of the job k (step S8). After that, the flow returns to step S6.

If an idle processor which can execute the job k at time Ti does not exist in step S7, the flow advances to step S9. In step S9, it is checked whether carry-ins converge at the release time Ti of a job which is released first after time T (step S9). In other words, the carry-in of each task are obtained at the time at which the job i has been released, and the time preceding from the release time by a time corresponding to the least common multiple of the cycle times of all tasks to be determined. If the carry-ins of the tasks are equal to each other at the two times, the carry-ins are determined to converge; if they are different from each other, the carry-ins are determined not to converge.

If the carry-ins converge (YES in step S9), the flow advances to step S10 to determine that real-time scheduling is possible, and the flow ends (step S10). If the carry-ins do not converge (NO in step S9), the flow advances to step S9' to update T to Ti (step S9'), and returns to step S3.

If Ti>Tj in step S4, the flow advances to step S11. In step S11, it is checked whether the job j generates a deadline miss.

More specifically, it is determined that no deadline miss occurs if the execution end time of the job j falls within the time till the predetermined absolute deadline time of the job after the release time of the job j. If the job j does not end by the absolute deadline time, it is determined that a deadline miss occurs.

If the job j generates a deadline miss (YES in step S11), the flow advances to step S12 to determine that real-time scheduling is impossible, and the flow ends (step S12). If the job j does not generate any deadline miss (NO in step S11), the flow advances to step S11' to update T=Tj (step S11'), and then returns to step S3.

Another real-time schedulability determination process in step S102 of FIG. 14 will be explained with reference to the flowchart shown in FIG. 9.

In the real-time schedulability determination process shown in FIGS. 7 and 8, every time a new job is released in accordance with scheduling, it is determined whether carry-ins converge at the job release time. Further, every time a job in execution ends, it is determined whether the job generates a deadline miss.

Figure 9:
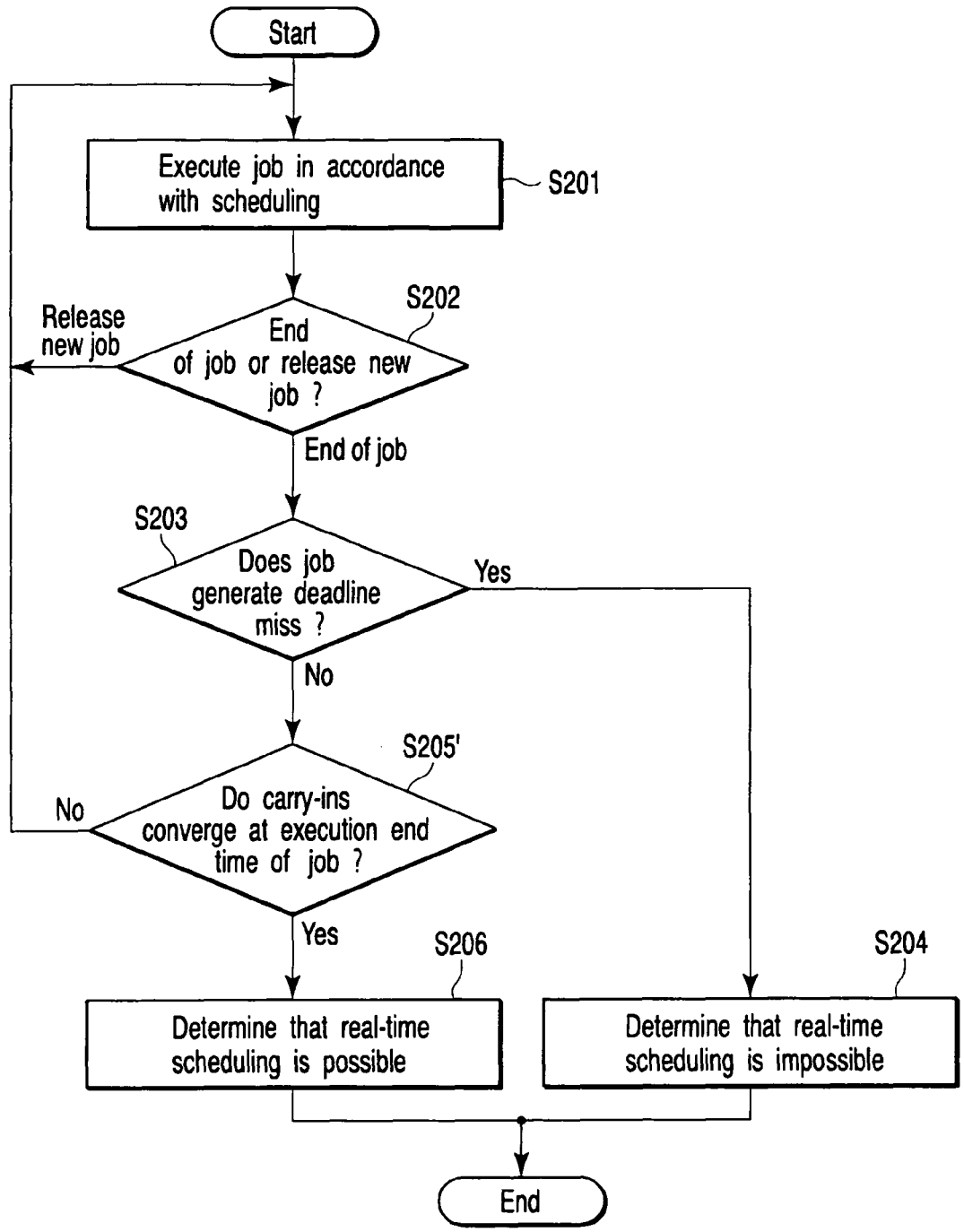
FIG. 9 is a flowchart for explaining another real-time schedulability determination process (first schedulability determination process) according to the first embodiment.

In FIG. 9, every time a job in execution ends, it is determined whether the job generates a deadline miss, and whether carry-ins converge. In FIG. 9, the same reference numerals as in FIG. 7 denote the same steps, and only different steps will be explained.

In FIG. 9, the simulation is performed to schedule all tasks subjected to schedulability determination by using the scheduling program 10b, and sequentially execute jobs from a job of the highest priority (step S201). If a new job is released in the simulation (step S202), the flow returns to step S201.

If a job in execution ends in the simulation (step S202), the flow advances to step S203 to determine whether the job generates a deadline miss. If the job does not generate any deadline miss, the flow advances to step S205' to determine whether carry-ins converge at the execution end time of the job.

If the ended job generates a deadline miss in step S203, it is determined that real-time scheduling is impossible (step S204), and the schedulability determination process ends.

If carry-ins converge at the execution end time of the job in step S205', it is determined that real-time scheduling is possible (step S206), and the schedulability determination process ends.

If carry-ins converge in step S205', it is determined in step S203 that jobs which have been executed by the time at which the carry-ins converge do not generate any deadline miss.

In step S203, it is determined that no deadline miss occurs if the job ends within a predetermined deadline time (the time till the absolute deadline time) of the job (task) after the release time (start time of the cycle time) of the processed job. If NO in step S203, it is determined that a deadline miss occurs.

In step S205', the carry-ins of each task are obtained at the execution end time of the job, and the time preceding from the execution end time by a time corresponding to the least common multiple of the cycle times of all tasks to be determined. If the carry-ins of the tasks are equal to each other at the two times, the carry-ins are determined to converge; if they are different from each other, the carry-ins are determined not to converge.

The validity of the schedulability determination processes in FIGS. 7 and 9 will be described by proving that the schedulability determination processes shown in FIGS. 7 and 9 always return a correct determination result (return a determination result "real-time scheduling is possible" when a set of tasks can be actually scheduled in real time or return a determination result "real-time scheduling is impossible" when a set of tasks cannot be actually scheduled in real time).

The following two propositions are to be proved.

First proposition) Carry-ins converge when a set of tasks can be scheduled in real time by using the scheduling algorithm.

Second proposition) A deadline miss occurs when a set of tasks cannot be scheduled in real time by using the scheduling algorithm. A deadline miss occurs only when a set of tasks cannot be scheduled in real time by using the scheduling algorithm.

Of these two propositions, as the second proposition is obvious, its proof will be omitted, and only the first proposition will be proved.

First, letting CI (i,T) be a carry-in at time T of a task i, it will be proved that a relation CI (i,T)≦CI (i,T+L) holds (carry-in is monotonic).

The proof is based on reductio ad absurdum. Assume that carry-in monotonicity does not hold true, and let T1 be the smallest T which satisfies CI (i,T+L)<CI (i,T), and i1 be i at this time. Also, let j1 be a job whose cycle contains time T among jobs of the task i1, j2 be a job whose cycle contains time T+L among jobs of the task i1, and R1 be cycle start time (release time) of the job j1. Then, the release time of the job j2 is R1+L.

Figure 10:
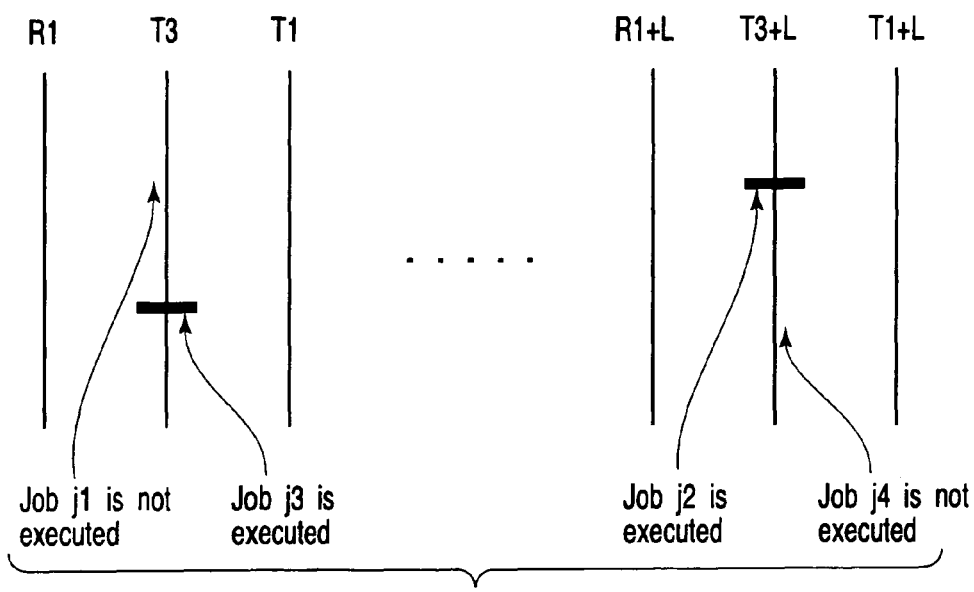
FIG. 10 is a graph for explaining carry-in monotonicity.

That CI (i1,T1+L)<CI (i1,T) holds means that the time during which the time during which the job j2 is executed between time R1+L and time T1+L is shorter than the time during which the job j1 is executed between time R1 and time T1. That is, time T3 (R1≦T3≦T1) exists which satisfies a condition that the job j1 is not executed at time T3 during a period from time R1 to time T1 but the job j2 is executed at time T3+L (assume that time T3 is the "smallest" among times which satisfy this condition). From this, by properly selecting a task i3, there is always a case in which a job j3 of the task i3 is executed at time T3 but a job j4 of the task i3 is not executed at time T3+L, as shown in FIG. 10.

That The job j3 is executed at time T3 means that the job j3 is higher in priority than the job j1. That the job j4 is not executed at time T3+L corresponds to 1. the job j4 is lower in priority than the job j2, or
2. execution of the job j4 ends at time T3+L.

If the job j4 is lower in priority than the job j2, the "conditions associated with the priority of a task" described above are violated. If execution of the job j4 ends at time T3+L, CI (i3,T3+L)<CI (i3,T3) must hold, which violates the minimality of T.

From this, it is proved that carry-in is monotonic.

It will be proved that carry-ins converge when a set of tasks can be scheduled in real time by using the scheduling algorithm.

The proof is based on reductio ad absurdum. Assume that a set of tasks can be scheduled in real time by using the scheduling algorithm and carry-ins sometime do not converge. A combination of the assumption that carry-ins sometimes do not converge with the proved carry-in monotonicity reveals that the carry-in of a given task keeps increasing. This means that a deadline miss occurs sooner or later, i.e., real-time scheduling is impossible, which is fallacious. This means that the hypothesis is wrong, and thus it can be proved that carry-ins converge when a set of tasks can be scheduled in real time by using the scheduling algorithm.

From this, the validity of the schedulability determination processes in FIGS. 7 and 9 is proved.

As described above, according to the first embodiment, the distribution of execution times in the cycle time when jobs assigned to a plurality of processors (VPUs 2a to 2c) are executed by these processors is calculated by performing the simulation using the scheduling algorithm (scheduling program 10b) used for actual scheduling. Then, it is determined whether each job ends by a predetermined allowed time (absolute deadline time) of the job. If the distributions (job execution patterns) of execution times in the processors for jobs determined to end by the allowed time converge, scheduling is determined to be possible. If a job (job which generates a deadline miss) which has not ended by the allowed time is obtained, scheduling is determined to be impossible.

With this arrangement, the simulation is performed until the job execution patterns of tasks to be determined converge, and scheduling is determined to be possible. If even one job which generates a deadline miss is detected, scheduling is determined to be impossible. Hence, whether real-time scheduling is possible or impossible can be accurately determined at a high speed.

Whether scheduling is possible or impossible can be accurately determined at a time as early as possible after the latest execution start time among the execution start times (release times) of tasks.

The schedulability determination process is performed for a predetermined time. When job execution patterns do not converge and a job which generates a deadline miss is not detected, it is desirably determined upon the lapse of a predetermined time that scheduling is impossible.

Second Embodiment

In the first embodiment, the schedulability determination process can be applied to each task (periodic task) to be determined without any limitation. However, when the deadline times of all tasks to be determined fall within the cycle times of the tasks, a time at which the start times of the cycle times of all the tasks coincide with each other exists, and such time periodically appears, determination of whether carry-ins converge in step S205 of FIG. 7 can be omitted, and whether scheduling is possible or impossible can be determined by determining whether a deadline miss is generated.

Figure 11:
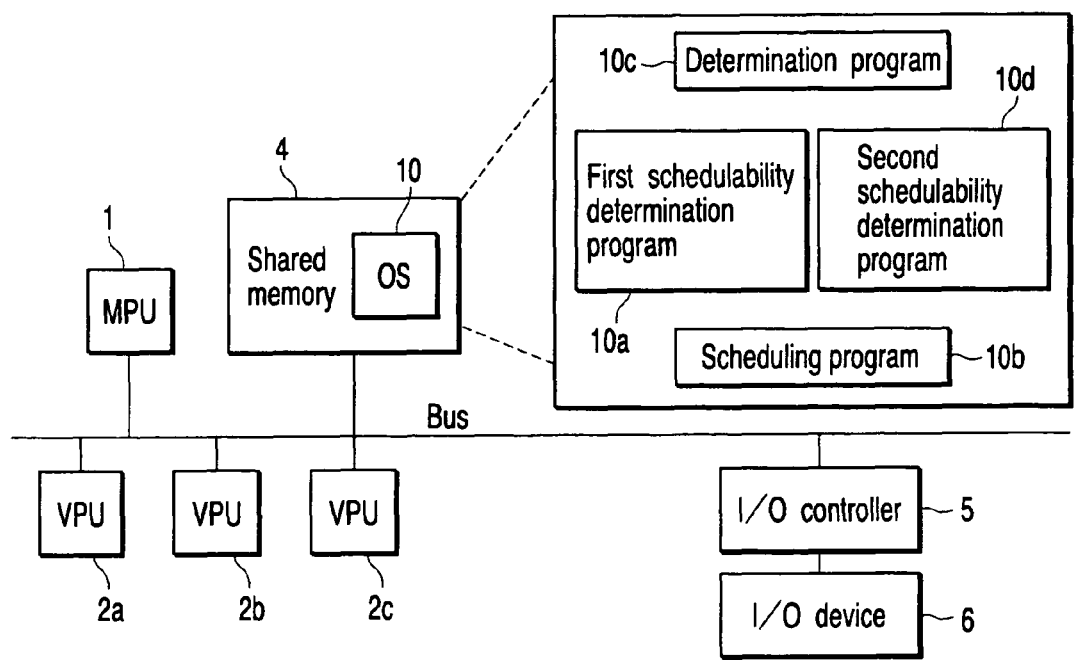
FIG. 11 is a block diagram showing an example of the configuration of a real-time system according to the second embodiment.

FIG. 11 shows an example of the configuration of a real-time system according to the second embodiment. For example, the real-time system is embedded in a computer system. In FIG. 11, the same reference numerals as in FIG. 1 denote the same parts, and only different parts will be described. An OS 10 in FIG. 11 includes a first schedulability determination program 10a corresponding to the real-time schedulability determination program 10a in FIG. 1, a scheduling program 10b, and a second schedulability determination program 10d prepared by simplifying the first schedulability determination program 10a, and a determination program 10c for determining which of the first and second schedulability determination programs 10a and 10d is to be selected.

The first schedulability determination process executed by an MPU 1 using the first schedulability determination program 10a is identical to that in FIG. 7 or 9. The second schedulability determination process executed by the MPU 1 using the second schedulability determination program 10d is executed when the deadline times of all tasks to be determined fall within the cycle times of the tasks and start times of the cycle times of all the tasks periodically coincide with each other.

A determination process executed by the MPU 1 using the determination program 10c is performed when, e.g., a request to execute a given application program is issued.

Figure 15:
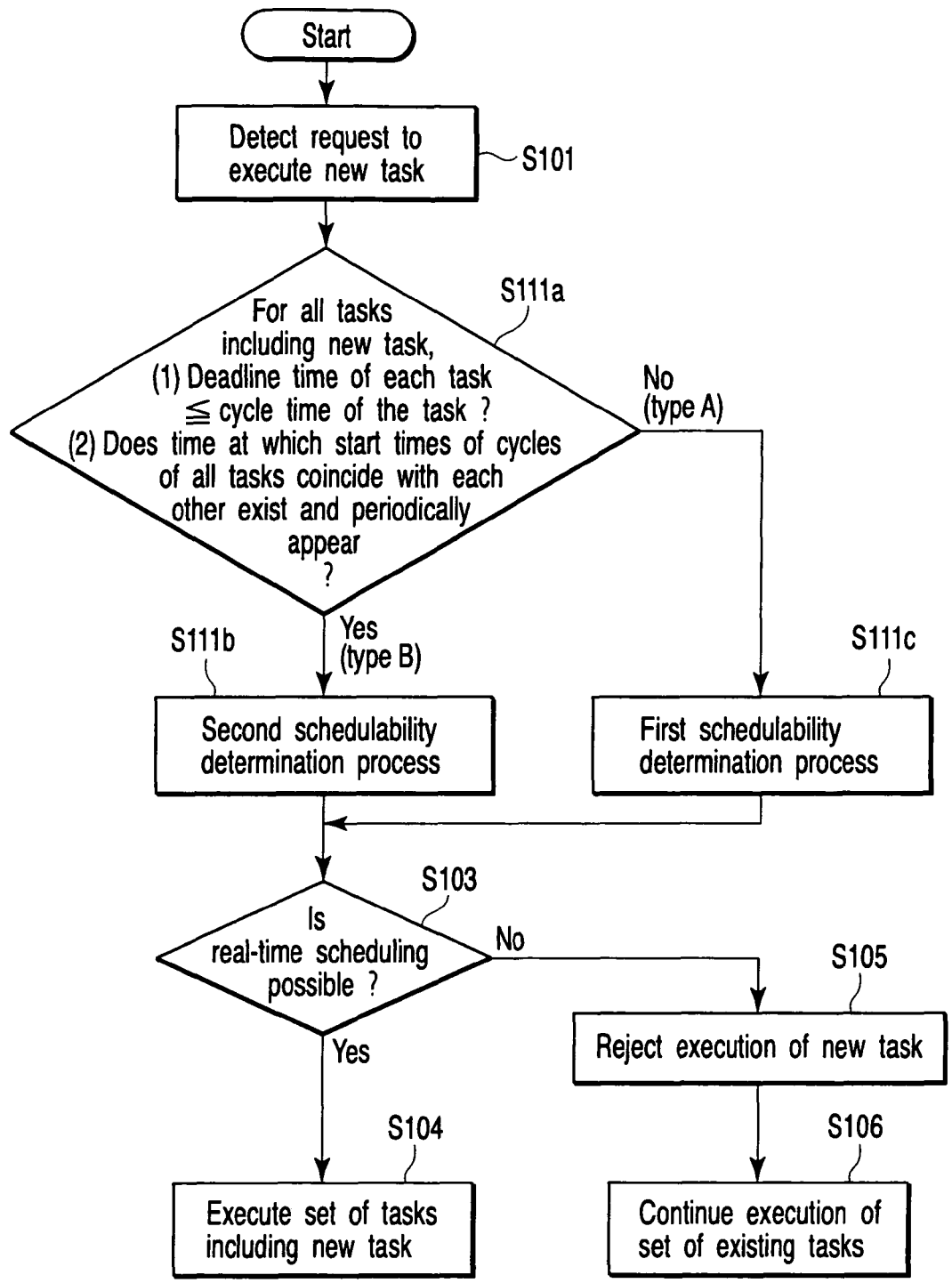
FIG. 15 is a flowchart for explaining an outline of process operation of the real-time system according to the second embodiment.

FIG. 15 is a flowchart for explaining another process operation when, for example, a request to execute a given application program (new task) is detected in the computer system of FIG. 11. In FIG. 15, the same reference numerals as in FIG. 14 denote the same steps, and only different steps will be described.

In FIG. 15, steps S111a to S111c replace step S102 of FIG. 14.

If a request to execute a new task is detected (step S101), the above-described determination process is executed to check whether the following two conditions are satisfied, on the basis of parameter information (FIG. 4) of all tasks including the new task and existing tasks (step S111a).

First condition) The deadline time of each task falls within the cycle time of the task.

Second condition) A time at which the start times of the cycle times of all tasks coincide with each other exists, and such time periodically appears.

If all the tasks including the new task and existing tasks satisfy both the first and second conditions (YES in step S111a), the flow advances to step S111b to perform the second schedulability determination process (step S111b). If NO in step S111a, the flow advances to step S111c to perform the first schedulability determination process (step S111c).

While loading parameter information of each task stored in a shared memory 4, the MPU 1 performs the determination process and the first and second schedulability determination processes.

The process from step S103 is the same as that in FIG. 14.

The first schedulability determination process is the same as that in FIG. 7 or 8, a description thereof will be omitted, and the second schedulability determination process will be explained.

A set of tasks to be determined in the second schedulability determination process satisfy the first and second conditions, as described above. The second schedulability determination process is the same as the first schedulability determination process in that the simulation is done actually using the scheduling algorithm (scheduling program 10b), whether a deadline miss occurs is checked in some early cycles (not in all the cycles of tasks), and whether real-time scheduling is possible is determined using the check result. However, this determination can be made by a simpler, higher-speed method because only a set of tasks whose conditions are limited are determined.

When the start times of the cycle times of all tasks periodically coincide with each other, as given by the second condition, the time at which the start times of the cycle times of all tasks coincide with each other will be called "grid time".

Figure 12:
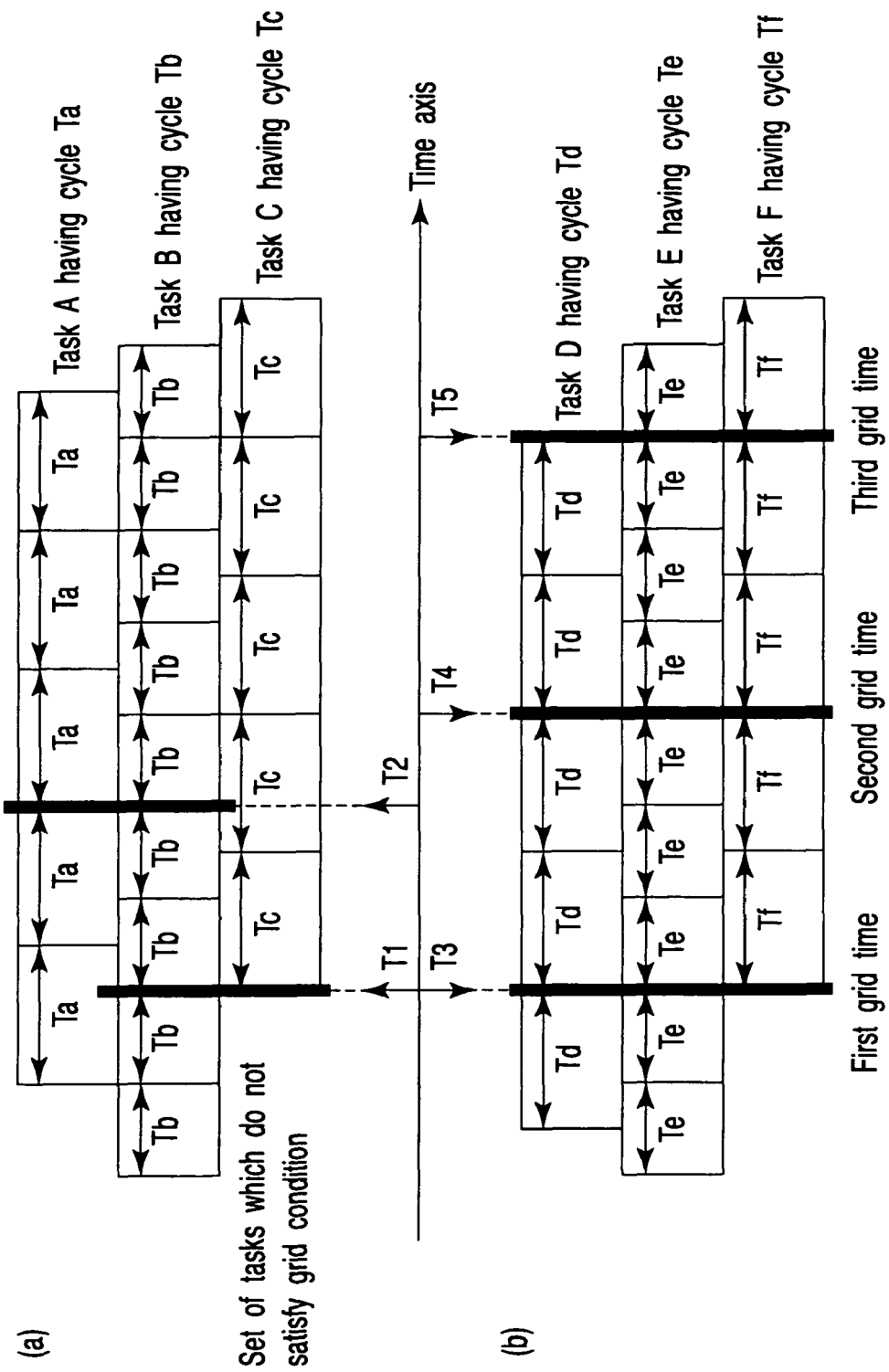
FIG. 12 is a timing chart for explaining a grid and grid time.

The second condition will be explained with reference to FIG. 12. (a) of FIG. 12 shows along the time axis (abscissa) a state in which a set of three tasks (tasks A, B, and C) having no grid time are executed in their cycle times. (b) of FIG. 12 shows along the time axis (abscissa) a state in which a set of three tasks (tasks D, E, and F) having a grid time are executed in their cycle times.

For the set of three tasks A, B, and C, no time exists at which the start times of the cycle times of the tasks coincide with each other after the latest release time among the release times of the three tasks. For example, the cycle times of tasks B and C simultaneously start at time T1, but that of task A does not start at time T1. The cycle times of tasks A and B simultaneously start at time T2, but that of task C does not start at time T2.

To the contrary, as shown in (b) of FIG. 12, for the set of three tasks D, E, and F, a time (grid time) at which the start times of the cycle times of the tasks coincide with each other exists after the latest release time among the release times of the three tasks. For example, the cycle times of the three tasks simultaneously start at times T3, T4, and T5. In (b) of FIG. 12, the first grid time is time T3, the second grid time is time T4, and the third grid time is time T5.

Based on this, the second schedulability determination process will be explained with reference to the flowchart shown in FIG. 13. When the deadline times of all tasks to be determined fall within the cycles of the tasks and a time (grid time) at which the start times of the cycle times of all the tasks coincide with each other periodically appears, a property "no deadline miss occurs after the second grid time if no deadline miss occurs by the second grid time" is satisfied. The second schedulability determination process utilizes this property and performs a process as shown in FIG. 13.

Figure 13:
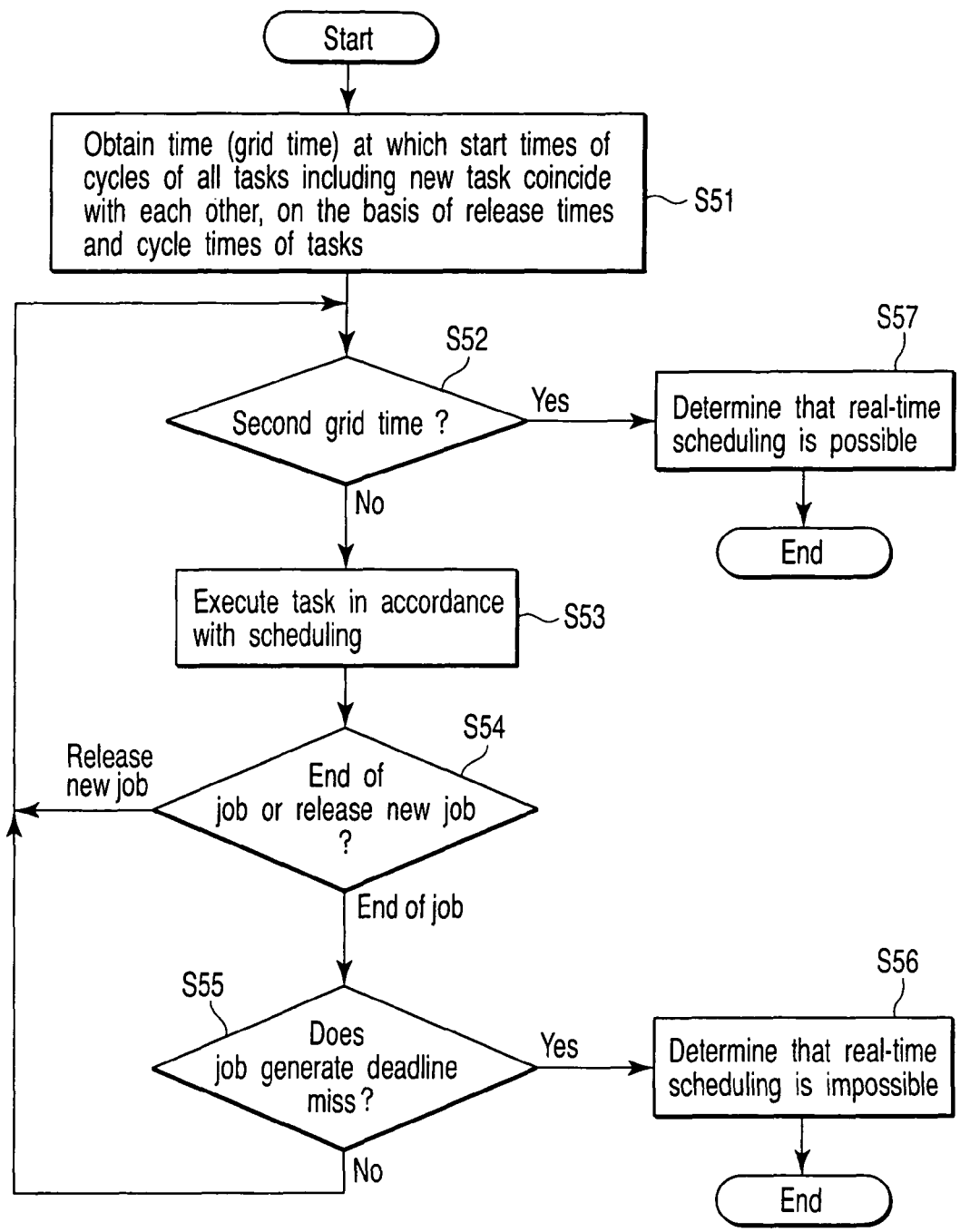
FIG. 13 is a flowchart for explaining a real-time schedulability determination process (second schedulability determination process) according to the second embodiment.

In the second schedulability determination process shown in FIG. 13, a simulation is performed while scheduling is done using the scheduling program 10b. Every time a job in execution ends in the simulation, it is checked whether the job generates a deadline miss. If a job which generates a deadline miss is not detected up to the time measured from the release time "0" of a task which is released first among all tasks to be determined reaches the second grid time, scheduling is determined to be possible.

The time (grid time) at which the start times of the cycle times of all tasks including a new task and existing tasks coincide with each other is obtained on the basis of the release time and cycle which are contained in parameter information of each task to be determined (step S51).

The simulation is performed while scheduling is done using the scheduling program 10b. The simulation continues until the time measured from the release time "0" of a task which is released first among all tasks to be determined reaches the second grid time (steps S52 and S53).

If a new job is released in the simulation by the second grid time (step S54), the flow returns to step S52. If the measured time does not reach the second grid time (NO in step S52), the simulation continues again (step S53). If a job in execution ends (step S54), the flow advances to step S55.

In step S55, it is checked whether the job generates a deadline miss. If no deadline miss occurs, the flow returns to step S52.

If a job which generates a deadline miss is detected in step S55, the flow advances to step S56 to determine that real-time scheduling is impossible (step S56). No subsequent simulation is done, and the schedulability determination process ends.

If a new job is released in the simulation (step S54) and the current time is the second grid time, a job which generates a deadline miss is not detected by the second grid time. Thus, the process advances to step S57 to determine that scheduling is possible (step S57).

As described above, according to the second embodiment, when a grid time at which the start times of the cycle times of tasks coincide with each other periodically appears, scheduling is determined to be possible if jobs executed by a plurality of processors by the second grid time end by the allowed times (absolute deadline times) of the jobs (job which generates a deadline miss is not detected). If a job which does not end by its allowed time (job which generates a deadline miss) is detected by the second grid time, scheduling is determined to be impossible.

With this arrangement, when predetermined deadline times of respective tasks fall within predetermined cycle times of the tasks and the start times of the cycle times of the tasks periodically coincide with each other, whether real-time scheduling is possible or impossible can be accurately determined by performing the simulation by the second grid time among grid times at which the start times of the cycle times of the tasks coincide with each other.

When a set of tasks to be determined meet conditions that predetermined deadline times of respective tasks fall within predetermined cycle times of the tasks and that the tasks have periodic grids (states in which the start times of the cycle times of the tasks coincide with each other), the simplified second schedulability determination process according to the second embodiment is performed. If a set of tasks to be determined do not meet these conditions, the schedulability determination process according to the first embodiment is executed, and whether scheduling is possible or impossible can be accurately determined at a high speed in accordance with the characteristics of the set of tasks to be determined. Especially for a set of tasks which satisfy the above conditions, whether scheduling is possible or impossible can be determined at a higher speed.

The conventional method of performing the simulation by actually using the scheduling algorithm, and checking whether no deadline miss occurs in all the cycles of tasks takes a long calculation time for determination and is not practical. To the contrary, according to the first and second embodiments, the simulation is done actually using the scheduling algorithm, whether a deadline miss occurs is checked not in all the cycles of tasks but in some early cycles, and whether real-time scheduling is possible or impossible is determined using the check result.

More specifically, real-time schedulability is determined by the following method. In the simulation for a set of tasks, the scheduling method repeats a sequence of managing tasks in execution in processors and tasks in wait for execution, when a task in execution ends or a task in wait for execution is added, searching for an idle processor or suspending a job of a low priority in execution, and starting execution of a task of the highest priority in wait for execution. At this time, the real-time schedulability determination method also manages tasks in execution in processors and tasks in wait for execution, and checks two conditions:

1. letting L be the least common multiple of the cycles of all tasks, whether the execution patterns of the tasks converge by using a time interval L as a criterion, and
2. whether a job in execution generates a deadline miss.

When the execution patterns of tasks converge, it is determined without scheduling tasks after convergence that real-time scheduling is possible. If a task generates a deadline miss, it is determined without scheduling tasks after occurrence of the deadline miss that real-time scheduling is impossible.

According to the real-time schedulability determination method according to the first and second embodiments, when a set of periodic tasks and a scheduling method are given, whether the set of periodic tasks can be scheduled in real time can be accurately determined at a high speed by using the scheduling method.

The method of the present invention that is described in the first and second embodiments can be distributed by storing it as a program executable by a computer in a recording medium such as a magnetic disk (flexible disk, hard disk, or the like), an optical disk (CD-ROM, DVD, or the like), or a semiconductor memory.

According to the present invention, it can be accurately determined at a high speed whether a plurality of periodic tasks can be scheduled in real time in a plurality of processors.

What is claimed is:

1. A schedulability determination method in a real-time system including a plurality of processors for executing jobs of a plurality of periodic tasks each having a predetermined period, comprising:
    preparing scheduling means for assigning the processors each job in a period of each of the tasks;
    calculating a distribution of execution times during which jobs assigned by the scheduling means are executed on the processors;
    determining, based on the distribution, whether each of the jobs finishes by a deadline;
    determining that scheduling is impossible when one of the jobs is determined not to finish by the deadline;
    determining whether the distribution converges based on unexecuted jobs of the tasks whose periods have started at a first time point and a second time point that have a time difference corresponding to a least common multiple of the periods of the tasks, the distribution being of the execution times of the jobs each determined to finish by the deadline; and
    determining that scheduling is possible when the distribution converges, the distribution converging when the unexecuted jobs at the first time point and those at the second time point are identical to each other, wherein determining whether the distribution converges includes determining that the distribution converges when a distribution during one of two successive time intervals and a distribution during another one of two successive time intervals are identical to each other, each of the two successive time intervals corresponding to a least common multiple of the periods of the tasks after the latest release time among release times of the tasks.

2. The method according to claim 1, wherein the scheduling means assigns the each job to the processors in accordance with priority of the each job.

3. The method according to claim 2, wherein the scheduling means assigns the each job to the processors by using a scheduling algorithm of, when, a time difference in execution start time between two jobs of first task which is one of the tasks and a time difference in execution start time between two jobs of second task which is another of the tasks are integer multiples of a least common multiple of the periods of the tasks, and a job to be executed first among the two jobs of the first task is executed preferentially to a job to be executed first among the two jobs of the second task, executing a job to be executed later among the two jobs of the first task preferentially to a job to be executed later among the two jobs of the second task.

4. The method according to claim 1, wherein the scheduling means assigns the each job to the processors based on the deadline of the each job.

5. The method according to claim 1, wherein the scheduling means assigns the each job to the processors by using an EDF (Earliest Deadline First) algorithm.

6. A real-time system including a plurality of processors for executing jobs of a plurality of periodic tasks each having predetermined period, comprising:
    scheduling means for assigning each job in a period of each of the tasks to the processors;
    calculating means for calculating a distribution of execution times during which jobs assigned by the scheduling means are executed in the processors;
    first determination means for determining, based on the distribution, whether each of the jobs finishes by a deadline;
    second determination means for determining that scheduling is impossible, when one of the jobs is determined not to finish by the deadline;
    third determination means for determining whether the distribution converges based on unexecuted jobs of the tasks whose periods have started at a first time point and a second time point that have a time difference corresponding to a least common multiple of the periods of the tasks, the distribution being of the execution times of the jobs each determined to finish by the deadline; and
    fourth determination means for determining that scheduling is possible when the distribution converges, the distribution converging when the unexecuted jobs at the first time point and those at the second time point are identical to each other, wherein
    the fourth determination means determines that the distribution converges when a distribution during one of two successive time intervals and a distribution during another one of two successive time intervals are identical to each other, each of the two successive time intervals corresponding to a least common multiple of the periods of the tasks after the latest release time among release times of the tasks.

7. The system according to claim 6, further comprises:

fifth determination means for determining whether grid times exist after the latest release time among release times of the tasks, each of the grid times being a time point at which start times of periods of the tasks coincide with each other;

sixth determination means for determining that scheduling is possible, when the grid times exist and jobs assigned by the scheduling means by a second grid time are determined to finish by their deadline; and seventh determination means for determining that scheduling is impossible, when the grid times exist and one of jobs assigned by the scheduling means by the second grid time is determined not to finish by its deadline.

8. The system according to claim 6, wherein the scheduling means assigns the each job to the processors based on the deadline of the each job.

9. The system according to claim 6, wherein the scheduling means assigns the each job to the processors in accordance with priority of the each job.

10. The system according to claim 9, wherein the scheduling means assigns the each job to the processors by using a scheduling algorithm of, when, a time difference in execution start time between two jobs of first task which is one of the tasks and a time difference in execution start time between two jobs of second task which is another of the tasks are integer multiples of a least common multiple of the periods of the tasks, and a job to be executed first among the two jobs of the first task is executed preferentially to a job to be executed first among the two jobs of the second task, executing a job to be executed later among the two jobs of the first task preferentially to a job to be executed later among the two jobs of the second task.

11. The system according to claim 6, wherein the scheduling means assigns the each job to the processors based on the deadline of the each job.

12. The system according to claim 6, wherein the scheduling means assigns the each job to the processors by using an EDF (Earliest Deadline First) algorithm.

13. A non-transitory computer readable medium encoded with computer executable instructions, wherein the instructions, when executed by a processor, cause the processor to execute a method, the computer including a plurality of processors for executing jobs of a plurality of periodic tasks each having predetermined period, the method comprising:

assigning each job in a period of each of the tasks to the processors;

calculating a distribution of execution times during which jobs assigned are executed on the processors;

determining, based on the distribution, whether each of the jobs finishes by a deadline;

determining that scheduling is impossible when one of the jobs is determined not to finish by the deadline;

determining whether the distribution converges based on unexecuted jobs of the tasks whose periods have started at a first time point and a second time point that have a time difference corresponding to a least common multiple of the periods of the tasks, the distribution being of the execution times of the jobs each determined to finish by the deadline converge; and determining that scheduling is possible when the distribution converges, the distribution converging when the unexecuted jobs at the first time point and those at the second time point are identical to each other, wherein determining whether the distribution converges includes determining that the distribution converges when a distribution during one of two successive time intervals and a distribution during another one of two successive time intervals are identical to each other, each of the two successive time intervals corresponding to a least common multiple of the periods of the tasks after the latest release time among release times of the tasks.

* * * * *

UNITED STATES PATENT AND TRADEMARK OFFICE
CERTIFICATE OF CORRECTION

| | | |
|---|---|---|
| PATENT NO. | : 7,913,256 B2 | Page 1 of 1 |
| APPLICATION NO. | : 11/233176 | |
| DATED | : March 22, 2011 | |
| INVENTOR(S) | : Osamu Torii et al. | |

It is certified that error appears in the above-identified patent and that said Letters Patent is hereby corrected as shown below:

On the title page, Item (54), and column 1 should read:

-- SCHEDULABILITY DETERMINATION METHOD AND REAL-TIME SYSTEM FOR EXECUTING A PLURALITY OF PERIODIC TASKS HAVING A PREDETERMINED PERIOD --

Signed and Sealed this
Tenth Day of May, 2011

David J. Kappos
*Director of the United States Patent and Trademark Office*